United States Patent [19]

Toulouse

[11] Patent Number: 4,716,264
[45] Date of Patent: Dec. 29, 1987

[54] VACUUM SWITCH
[75] Inventor: Charles P. Toulouse, Winona, Minn.
[73] Assignee: Lake Center Industries, Winona, Minn.
[21] Appl. No.: 24,628
[22] Filed: Mar. 11, 1987
[51] Int. Cl.<sup>4</sup> ............................................. H01H 9/06
[52] U.S. Cl. .................................. 200/61.86; 137/596; 137/637
[58] Field of Search ..................... 200/61, 86; 137/637, 137/596

[56] References Cited
U.S. PATENT DOCUMENTS
3,637,961 1/1972 Fiddler et al. ................... 200/61.86

Primary Examiner—A. D. Pellinen
Assistant Examiner—Morris Ginsburg
Attorney, Agent, or Firm—Kinzer, Plyer, Dorn, McEachran & Jambor

[57] ABSTRACT

A vacuum switch for interchangeably connecting a plurality of vacuum lines includes a vacuum housing having a plurality of ports to which the vacuum lines are connectable. The vacuum housing has a plurality of channels molded in one surface of a plate and communicating with the ports. Each channel has at least one passage through the plate to the opposite surface. The channels are arranged to provide the desired fluidic logic. A one-piece seal member seals the channels to maintain a vacuum therein. A plurality of valves are slidable upon the surface of the plate opposite the channels. Each valve has a cavity providing fluid communication between passages when the cavity spans a pair of passages. Electrical contacts, movable with the valves, activate a circuit to provide an electrical signal corresponding to the desired mode selected for the vaccuum lines.

27 Claims, 9 Drawing Figures

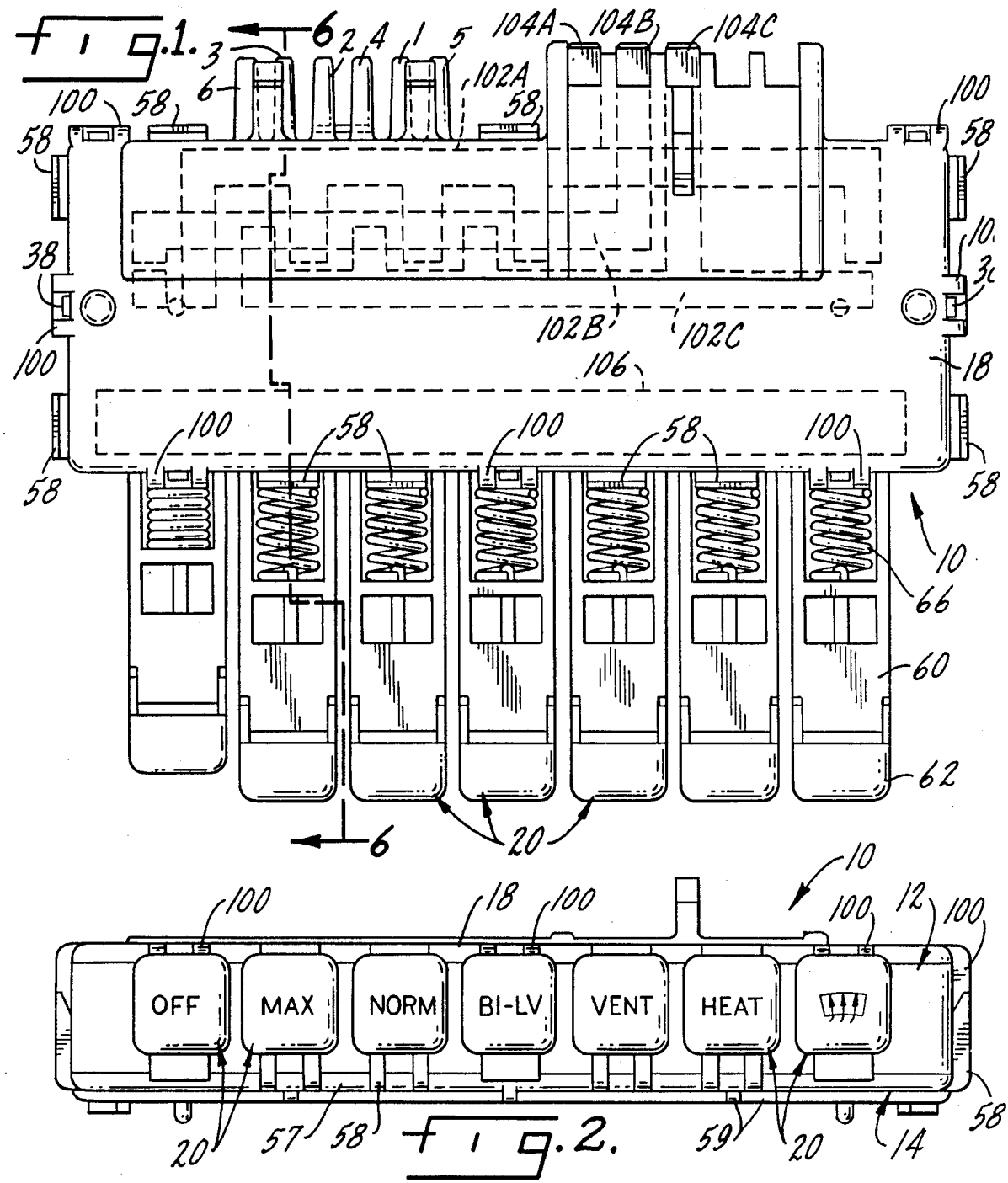
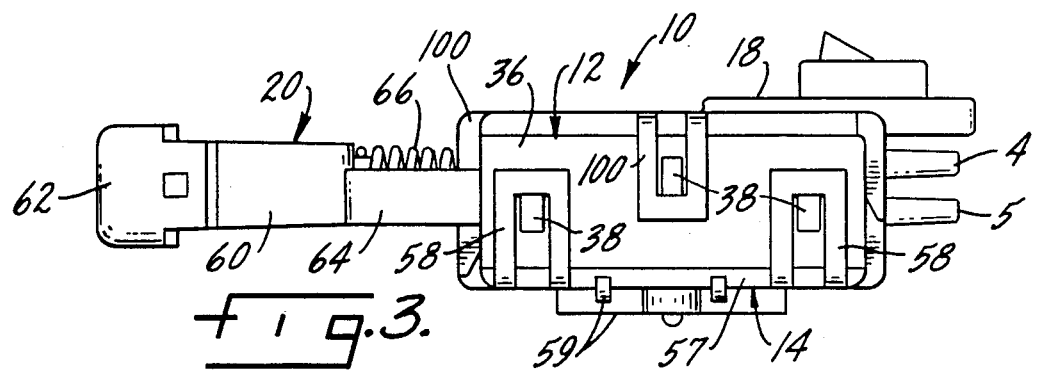

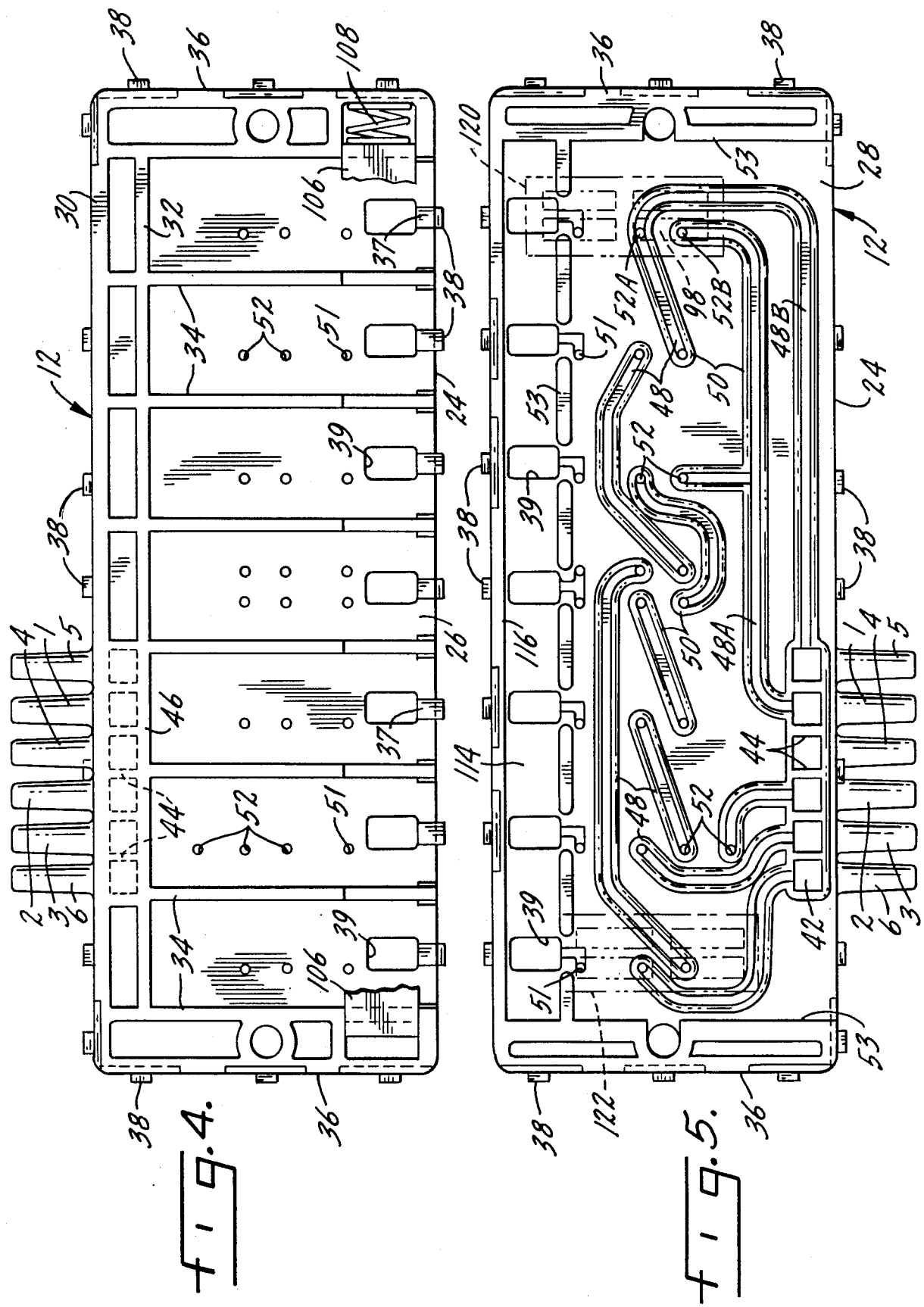

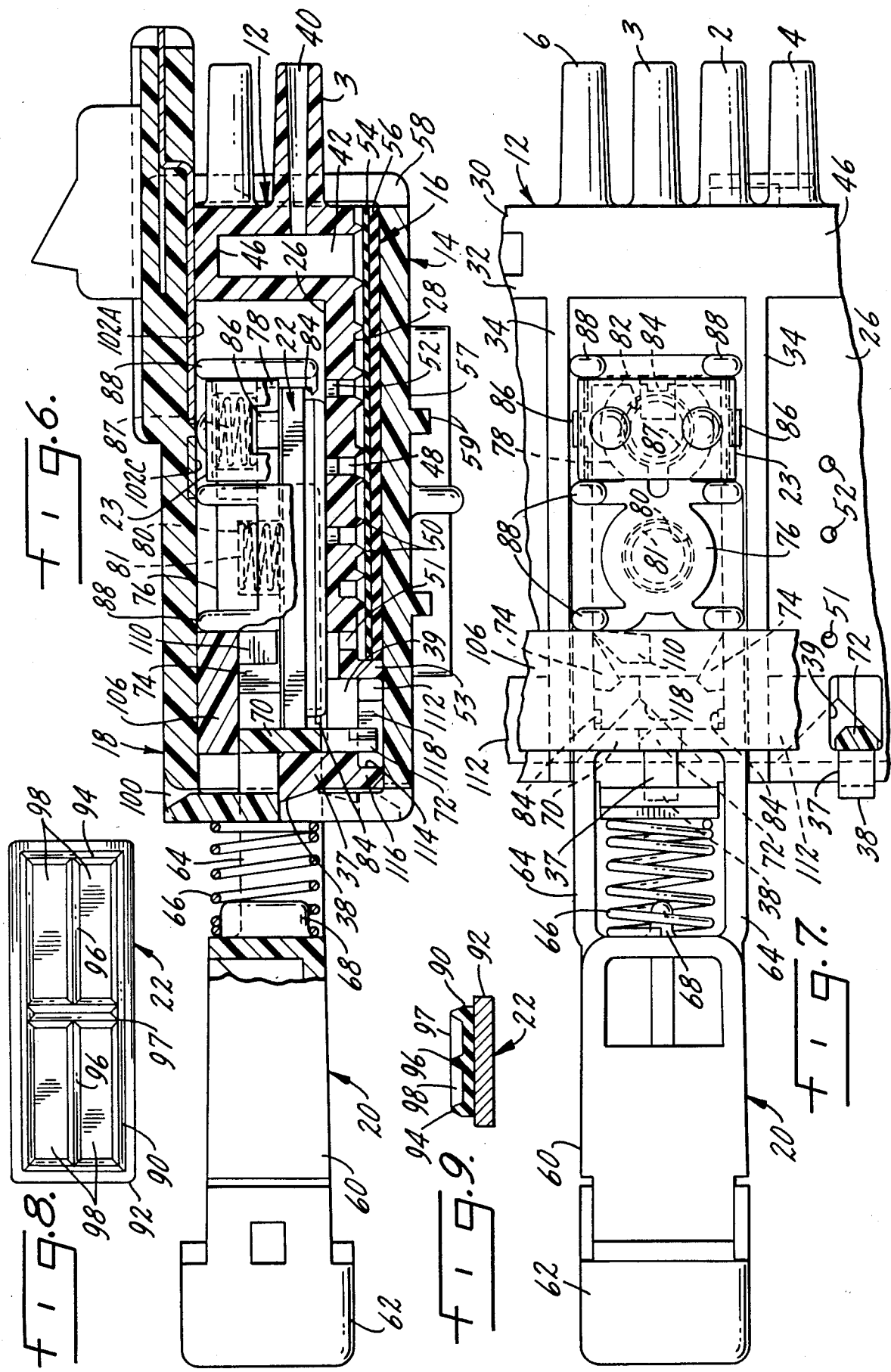

VACUUM SWITCH

SUMMARY OF THE INVENTION

This invention relates to a vacuum switch for connecting vacuum lines in variable combinations. The vacuum switch of the present invention is particularly applicable to a controller for the heating, ventilating and air conditioning (HVAC) system of an automobile. The switch will be shown and described as applied to such a system, although it could be used in other applications.

An HVAC system in an automobile typically includes a plurality of air vents or outlets located at various points on the dashboard, floor or doors of the vehicle. These vents will be supplied with air, either heated, cooled or ambient, in various combinations, depending on the mode of operation selected by the user. This requires certain of the vents to be closed while others are opened. Typically, the air passages leading to the vents have louvers or doors which can be opened or closed. The actuation of the doors can be achieved by a small vacuum motor connected thereto. The motors are connected to a vacuum source by vacuum lines. The switch of the present invention has the purpose of selecting and connecting the proper vacuum lines to a vacuum source in accordance with the mode of operation selected by the user. The switch contains the fluidic logic required to connect the proper vacuum lines to the vacuum source for a given mode of operation. In a sense, then, the switch operates as a manifold as it connects a single vacuum source input to a plurality of outputs in the form of the vacuum lines going to the vacuum motors.

Prior vacuum switches for automobiles have a housing with a movable valve therein for connecting or disconnecting the vacuum source to various output lines. However, the fluidic logic required is not built into the switch housing. Rather, the fluidic logic is supplied by an external manifold. These manifolds are constructed by assembling a number of molded hose fittings, such as tees and elbows, along with hose sections to create the desired vacuum logic. The fittings and hoses are solvent welded together in an effort to create a leak-free assembly. This method is expensive and the reject rate during manufacture is high because of the difficulty of individually sealing the many joints required by the fluidic logic. Further, joints that pass initial inspection tend to deteriorate, thereby causing reduced reliability in use. The present invention overcomes these problems by eliminating the external manifold.

Accordingly, a primary object of the present invention is a vacuum switch having an internal manifold providing the fluidic logic.

Another object of the invention is a vacuum switch having a single, integral seal for making all of the seals required by the internal manifold.

Another object of the invention is a vacuum switch having a reduced housing size and stack height.

A further object of the invention is a vacuum switch having increased reliability due to a reduction in internal passage spacing which in turn permits use of a smaller valve and shorter valve travel.

Still another object of the invention is a vacuum switch having reduced internal passage spacing which increases reliability by reducing the length of the valve sealing surface.

Another object of the invention is a vacuum switch which allows a shorter travel to operate and a lower operating effort on the part of the user.

Another object of the invention is a vacuum switch having electrical contacts which open and close along with the motion of the vacuum valves to provide an electrical signal corresponding to the setting of the valves.

These and other objects will become apparent in the following specification, drawings and claims.

BRIEF DESCRIPTION OF THE DRAWINGS

FIG. 1 a plan view of the vacuum switch of the present invention.

FIG. 2 is a front elevation view of the vacuum switch.

FIG. 3 is an end elevation view of the vacuum switch.

FIG. 4 is a top plan view of the vacuum housing.

FIG. 5 is a bottom plan view of the vacuum housing.

FIG. 6 is a section taken along line 6—6 of FIG. 1.

FIG. 7 is a plan view of a portion of the switch with the electrical cover removed.

FIG. 8 is a bottom plan view of a valve member.

FIG. 9 is a section through a valve member.

DETAILED DESCRIPTION OF THE INVENTION

FIGS. 1–3 illustrate the overall construction of the vacuum switch 10. In general, the switch includes a vacuum housing 12 having ports 1–6 for connection of the vacuum lines. Housing 12 also contains the fluidic logic circuit. A vacuum cover 14 encloses the bottom side of the housing 12 and urges a seal 16 (FIG. 6) against the housing. An electrical cover 18 encloses the top side of the housing 12 and constrains a plurality of pushbuttons 20 to reciprocal movement in the housing. Each pushbutton carries a valve 22 and an electrical bridging contact 23 (FIG. 6) for purposes to be described below. These parts will now be described in detail.

FIGS. 4–6 illustrate the construction of the vacuum housing 12. The vacuum housing is an integral, molded part made from plastic material such as capron 8266. The housing 12 has a generally flat plate 24 having an upper surface 26 and a lower surface 28. First and second back walls 30 and 32 extend upwardly from the upper surface 26 of the plate along the back edge thereof. A series of guide walls 34 extend upwardly from the upper surface of the plate, perpendicular to the back walls. The guide walls form slideways between them in which the pushbuttons and valves move. The vacuum housing further includes a pair of end walls 36 closing the ends of the switch package.

A series of upstanding posts 37 are placed along the front edge of the plate 24 at the center of each slideway. A pushbutton guide slot 39 is formed in the plate directly behind the posts 37. A plurality of tabs or notches 38 extend from the front edge of the posts 37, the back wall 30 and the end walls 36. These tabs provide attachment points for corresponding hooks on the vacuum cover and electrical cover, thereby permitting the covers to be fastened to the vacuum housing. The tabs have various shapes and sizes, the details of which will not be described.

The ports 1–6 extend from the back wall 30 of the vacuum housing. The vacuum lines (not shown) extending to the vacuum motors at the louver or door locations are connectable to the ports 1–6. Each port has an orifice 40 (FIG. 6) communicating with an entry chamber 42 disposed between the first and second back walls 30 and 32. The entry chamber 42 for each port is separated from adjacent chambers by partitions 44 and the top of the chambers is closed off by a top wall 46. The entry chambers are open to the bottom.

A plurality of separate channels 48 are formed in the lower surface 28 of the plate 24. Five of the channels are in fluid communication with the entry chambers 42. Others of the channels do not communicate directly with the entry chambers, but are located adjacent those that do. In the embodiment shown the depth of the channels extends somewhat beneath the lower surface 28 of the plate 24. That is, they extend into the thickness of the plate. The channels also include ridges 50 which extend beyond the surface 28. Thus, the channels extend both above and below the nominal surface of the plate. As can be seen in FIG. 5, the ridges extend around the entire periphery of the channels except where the channels enter an entry chamber 42. The channels 48 are open to the bottom. Each channel has one or more passages 52 extending from the bottom of the channel, through the thickness of the plate 24 to the upper surface 26. Vent holes 51 communicate with the slots 39 to release the vacuum. The channels 48 are laid out in such a manner as to create the desired fluidic logic. That is, when the valves 22 are placed in a certain condition, the channels will connect the vacuum source to the proper ports for conditioning the vacuum motors, and therefore the louvers, to effect the desired mode of operation.

The open sides of the channels 48 and entry chambers 42 are closed and sealed by the seal member 16. It is positioned on the lower surface of the plate by walls 53. The seal is an integral sheet laminated from a diaphragm 54 and a sponge 56. The diaphragm is preferably made of silicon having a durometer of 15 to 55. A lubricant may be applied to the diaphragm to further assist in sealing against the ridges 50 of the channels 48. The seal 16 is compressed against the ridges and lower surface 28 of the plate 24 by the vacuum cover 14. The vacuum cover 14 is essentially a flat panel 57 having a plurality of U-shaped hooks or snaps 58 extending therefrom to engage several of the tabs 38 on the vacuum housing 12. This retains the cover 14 on the housing 12 with a spacing between them which causes the seal 16 to be compressed against the lower surface of the housing plate. The cover further includes several stiffeners 59 to lend rigidity.

Details of the pushbuttons 20 can be seen in FIGS. 6 and 7. Each pushbutton has an outer body portion 60 to which a cap 62 may be attached. The cap will carry the desired indicia as in FIG. 2 for indicating the function of the particular pushbutton. A pair of arms 64 extend from the body 60 past the cover hooks 58 and posts 37, and into the slideways formed by the guide walls 34 on the vacuum housing. A spring 66 is disposed between the arms 64 to bias the pushbutton outwardly of the switch. A spring retaining peg 68 positions the spring 66 between the arms 64. The arms are joined by a cross brace 70 which includes a depending guide pin 72. The brace 70 is disposed just inside the posts 37 of the vacuum housing, with the guide pin 72 disposed in the slots 39. The pushbutton further includes a pair of detents 74 extending inwardly from the arms 64. The detents cooperate with the latch bar described below to retain the last pushbutton used in an activated condition while releasing the previous selection.

The inner end of the pushbutton has two spring seats 76 and 78. The spring seat 76 has a downwardly facing spring retention cavity 80, while seat 78 has an upwardly facing cavity 82. The space between the arms 64 and beneath the detents 74 and spring seats 76, 78 is open, forming a compartment for receipt of the valve member 22. The valve member is urged downwardly by a spring 81 in the cavity 80. Prior to final assembly the valve is held in its compartment by valve retainer hooks 84 located adjacent the brace 70 and under the spring retainer 78. After assembly the valve floats in its compartment, urged into contact with upper surface 26 of the housing plate by spring 81. A series of pegs 88 on the pushbutton engage the electrical cover 18 to restrain the vertical position of the pushbutton. A second pair of retaining hooks 86 is located on the sides of the spring seat 78 for retaining the electrical bridging contact 23. The electrical contact is a U-shaped member, the legs of which extend downwardly along the sides of the pushbutton. The legs have an opening therein for accommodating retaining hooks 86. A spring 87 in seat 78 urges the contact upwardly.

FIGS. 8 and 9 show details of the valve 22. The valve has a rubber contact element 90 adhesively secured to a metal backing plate 92. The contact element 90 is preferably made of silicon rubber of 40 durometer. The contact element has a rim 94 around its perimeter, a partition 96 and a vane 97 cooperating to define cavities 98. The rim, partition and vane are biased against the upper surface 26 of the vacuum housing by the valve spring 81. The cavities are spaced from plate surface 26. The vanes and partitions are located such that a particular cavity can span a pair of passages 52 (or a passage and vent 51) when the valve is appropriately positioned relative to the passages. That is, when the valve is in a first unactuated position, a vane 97 will be interposed between a passage and a vent, thereby preventing fluid communication between the passage and vent. A cavity 98 will span two passages to provide communication between them. When the pushbutton is moved to a second, actuated position, the vane 97 will no longer be between the passage and vent, but, instead, a cavity 98 will span the passage and vent, thereby providing fluid communication between them and venting that passage and channel. Also, in the second position, the vane 97 is interposed between passages, cutting off communication between them.

Details of the electrical cover 18 are shown in FIGS. 1 and 6. The cover 18 comprises a generally flat panel having hooks or snaps 100, similar to the hooks 58 on the vacuum cover 14, for engaging the tabs 38 to hold the cover 18 on housing 12. The cover's lower or inside surface is spaced from the upper surface 26 of plate 24 such that the pegs 88 of the pushbuttons will be in contact with the cover. This supports the pushbutton against the action of the valve spring 81, thereby maintaining the valve 22 in sealing relation against surface 26. The cover 18 further includes three stationary electrical contacts 102A,B,C which are insert molded into the cover. The contacts extend to exposed terminals 104A,B,C for connection to an electrical power supply, an air conditioner clutch, a blower switch or the like. Contacts 102A and 102C are exposed on the lower surface of the electrical cover. They present an interdigitated pattern of conductors which can be shorted by the bridging contact 23 of a pushbutton. So movement of a pushbutton actuates both electrical and vacuum circuits in the switch.

The switch 10 further includes a latch bar 106 as shown in FIGS. 1, 4 and 6. The latch bar is biased to the left of the switch by a spring 108 (FIG. 4). A plurality of teeth 110, one for each pushbutton, extend from the latch bar. As best seen in FIG. 7, the teeth cooperate with the pushbutton detents 84 to retain the last button pushed in its actuated position while releasing the previously actuated button. When a button is pushed inwardly the cooperating angled surfaces of detent 84 and tooth 110 push the latch bar 106 to the right (or toward the bottom of FIG. 7) against spring 108. This movement of the latch bar releases the previously actuated button, as its spring 66 will force it out. When the newly-actuated pushbutton's detent clears the point of tooth 110, the spring 108 will force tooth 110 in behind the detent to prevent the button from releasing under the pressure of its spring 66.

Six lockout stops 112 cooperate with the latch bar mechanism to assure that only one pushbutton at a time can be actuated. The stops 112 are aligned edge-to-edge in a lockout slot 114 formed under the front edge of the vacuum housing. The lockout slot is bounded by walls 53, a lip 116 and the outside guide pins 72 (i.e., the guide pins on the off and defrost buttons). The stops are slidable on the vacuum cover panel 57. The lockout slot 114 is only wide enough to accommodate the six stops plus the width of one guide pin 72. When a pushbutton is actuated its guide pin 72 engages the angled surface 118 of adjacent stops 112, pushing them aside until the pin is located between two stops and all stops abut each other and/or the outer guide pins. This fills the lockout slot so that the stops can no longer slide. If a subsequent button is pushed while the first button is held in, the second button's pin 72 will be unable to push the stops aside and it will not reach the actuated position. Ordinarily, of course, the latch bar will release the previously-actuated button, allowing a subsequent button to be actuated. Thus, the lockout stops only come into play if an attempt is made to actuate two or more buttons at once.

The operation of the switch is as follows. The ports are connected according to the following schedule: vacuum source to port 1; outside air recirculation to port 2; heater to port 3; port 4 is not used in this embodiment; defrost to port 5; air conditioning to port 6. The typical position of a valve's rims 94, partitions 96 and vanes 97 relative to vents 51 and passages 52 when a pushbutton is released is illustrated in phantom at 120 in FIG. 5. The typical pushbutton position when actuated is shown in phantom at 122. These representations are of the defrost button and off button, respectively, and thus show conditions when the user has selected to turn off the HVAC system. It can be seen that under the above-described conditions the channel 48A connected to the source port 1 will always be under a vacuum. By virtue of the valve cavity 98 spanning passages 52A,B, channel 48B connected to the defrost port 5 will communicate with channel 48A and thus be under a vacuum. Only when the defrost pushbutton is actuated to interpose the valve vane 97 between the passages 52A,B will channel 48B and port 5 be vented. In a similar manner, the vacuum is transferred throughout the various channels except where prevented by a particular valve. There are special arrangements at two of the slideways. The "max" button controls three colinear passages with the innermost rim 94 controlling the inside passage. The "bi-lev" button has parallel pairs of passages controllable by one valve (due to the presence of partition 96). Only one pushbutton can be actuated at a time, due to the presence of the latch bar and lockout stops. So only one valve can be in the position 122 while all others will be in position 120. Briefly, the fluidic logic shown will produce the following results: port 1 is always under vacuum; port 2 is always vented except when "max" is pushed; port 3 is vented except when off, heat or defrost is pushed; port 4 is not used; port 5 is always under vacuum except when defrost is pushed; port 6 is vented except when max, normal or vent is pushed.

From the foregoing it can be seen that the vacuum switch has an internal manifold with a single, one-piece seal for sealing the manifold. The passages 52 can be spaced closely together to minimize travel and the length of the valve surface required. It will be understood, however, that these advantages could be achieved by embodiments other than the specific one shown. Therefore, the invention is not limited by the embodiment shown, but only by the scope of the following claims.

I claim:

1. A vacuum switch for connecting a plurality of vacuum lines in variable combinations, comprising:
   a vacuum housing including a plurality of ports connectable to the vacuum lines, and a plate member having on one side a plurality of separate channels, at least two of the channels being in fluid communication with separate ports, each channel having at least one passage therein extending through the plate member;
   seal means for sealing the channels sufficiently to maintain a vacuum in them;
   a plurality of valves slidably engaging, in sealing relation, the surface of the other side of the plate member, each valve having a cavity in its central portion adjacent the surface of the plate to provide fluid communication between two channels when the valve is placed such that the cavity spans a pair of passages.

2. The switch of claim 1 wherein the vacuum housing is formed as a single, integral part.

3. The switch of claim 1 further comprising a plurality of guide walls formed on said other side of the plate member, the guide walls defining slideways for the valves.

4. The switch of claim 1 further comprising a plurality of pushbuttons engageable with the valves to move them back and forth.

5. The switch of claim 4 wherein each valve is floatingly engaged with a pushbutton in a direction perpendicular to the plate surface such that the valve may be biased into engagement with the plate without corresponding motion of the pushbutton.

6. The switch of claim 1 wherein the channels have an open side which is closed by the seal means.

7. The switch of claim 6 wherein the seal means is a single sheet of flexible material covering all open sides of the channels.

8. The switch of claim 1 wherein the channels include ridges protruding above the surface of the plate.

9. The switch of claim 1 wherein the channels at least partially extend below the surface of the plate.

10. The switch of claim 1 wherein the channels at least partially extend below the surface of the plate and have ridges protruding above the surface of the plate.

11. The switch of claim 10 wherein the seal means is a single sheet of flexible material covering all of the channels in sealing engagement with the ridges.

12. The switch of claim 1 wherein the seal means is a single sheet of flexible material covering all of the channels.

13. The switch of claim 12 further comprising a vacuum cover attached to the vacuum housing and urging the seal means into engagement with the channels.

14. The switch of claim 1 further comprising a set of stationary electrical contacts and a plurality of electrical bridging contacts carried with the valves to close a pair of the stationary contacts when the valve is placed in a selected position.

15. The switch of claim 14 wherein the stationary contacts are insert molded in an electrical cover which is attached to the vacuum housing.

16. The switch of claim 14 further comprising a plurality of pushbuttons engageable with the valves to move them back and forth, the electrical bridging contacts being mounted on and movable with the pushbuttons.

17. A vacuum switch for connecting a plurality of vacuum lines in variable combinations comprising a vacuum housing having a plurality of vacuum channels molded therein to form the desired fluidic logic, an integral seal covering the vacuum channels in sufficient sealing relation to maintain a vacuum in the channels, a plurality of passages in fluid communication with the channels, a plurality of valves movable within the housing to alternately provide or prevent fluid communication between said passages and therefore between the channels, and a plurality of ports communicating with the channels and providing attachment points for the vacuum lines.

18. The switch of claim 17 wherein the vacuum housing is formed as a single, integral part.

19. The switch of claim 17 further comprising a plurality of pushbuttons engageable with the valves to move them back and forth.

20. The switch of claim 19 wherein each valve is floatingly engaged with a pushbutton in a direction perpendicular to the plate surface such that the valve may be biased into engagement with the plate without corresponding motion of the pushbutton.

21. The switch of claim 17 wherein the channels have an open side which is closed by the seal means.

22. The switch of claim 21 wherein the seal means is a single sheet of flexible material covering all open sides of the channels.

23. The switch of claim 17 wherein the seal means is a single sheet of flexible material covering all of the channels.

24. The switch of claim 23 further comprising a vacuum cover attached to the vacuum housing and urging the seal means into engagement with the channels.

25. The switch of claim 17 further comprising a set of stationary electrical contacts and a plurality of electrical bridging contacts carried with the valves to close a pair of the stationary contacts when the valve is placed in a selected position.

26. The switch of claim 25 wherein the stationary contacts are insert molded in an electrical cover which is attached to the vacuum housing.

27. The switch of claim 25 further comprising a plurality of pushbuttons engageable with the valves to move them back and forth, the electrical bridging contacts being mounted on and movable with the pushbuttons.

* * * * *